Patented Mar. 15, 1949

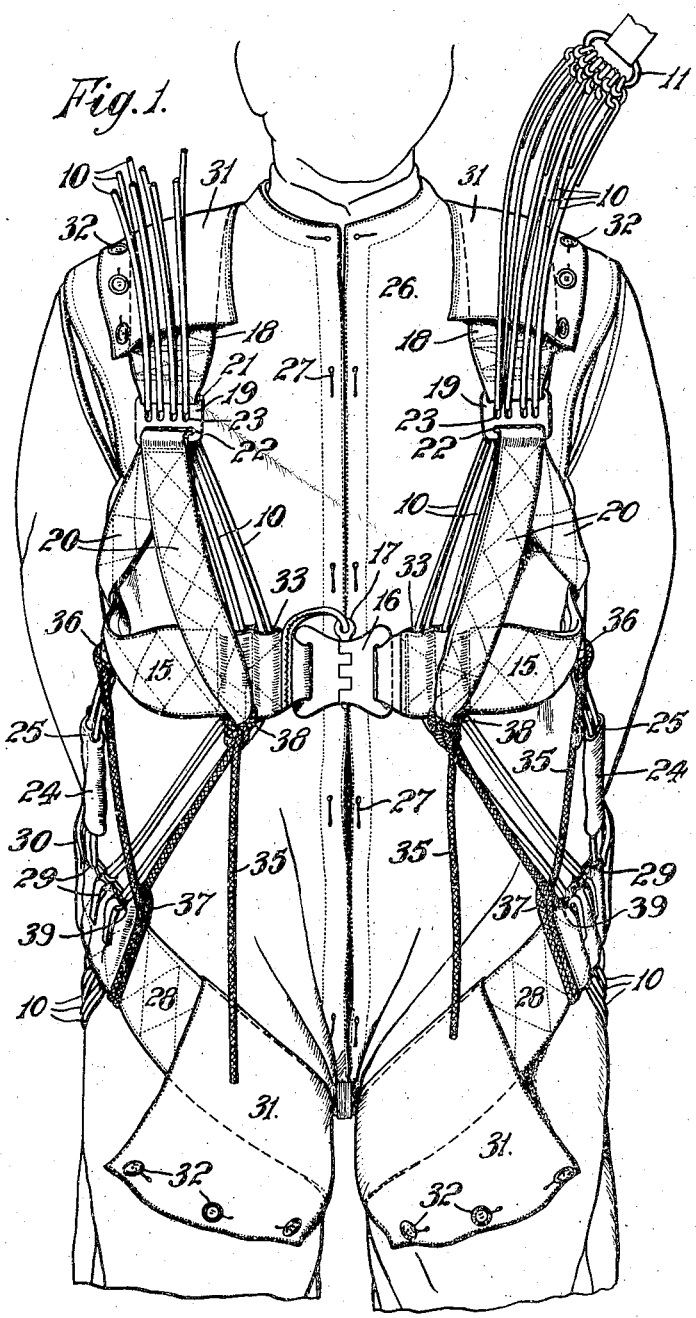

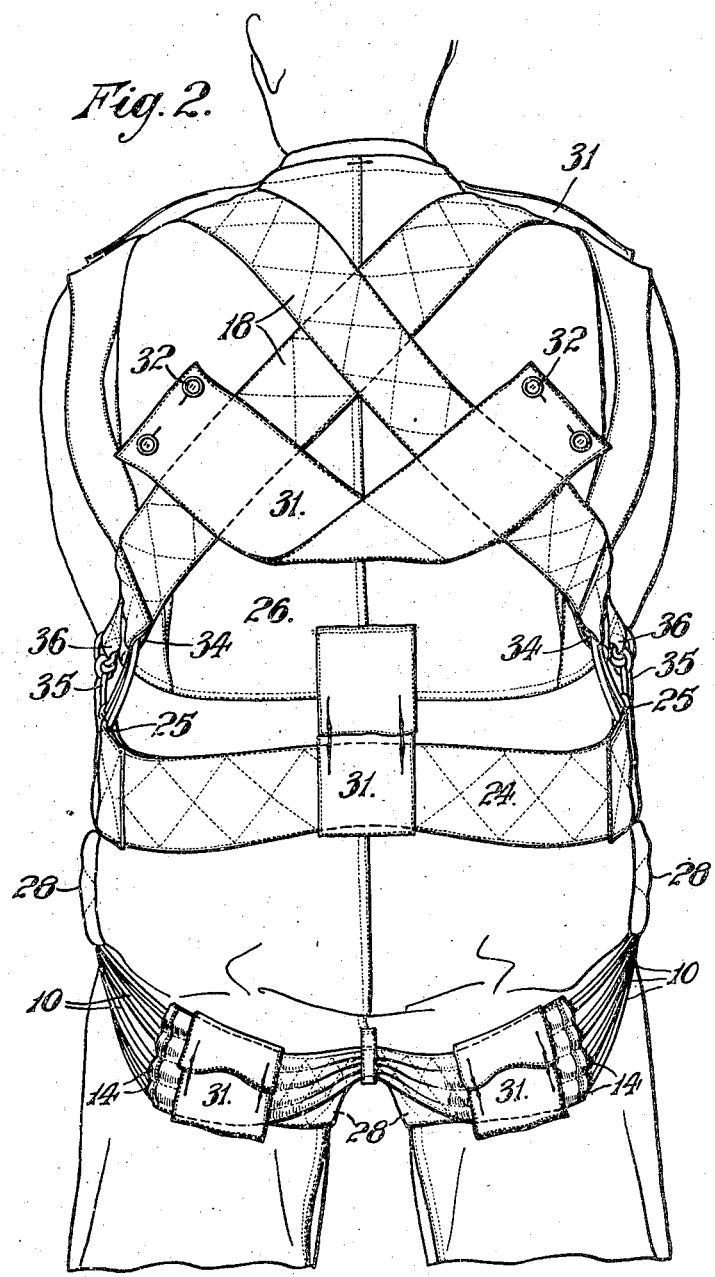

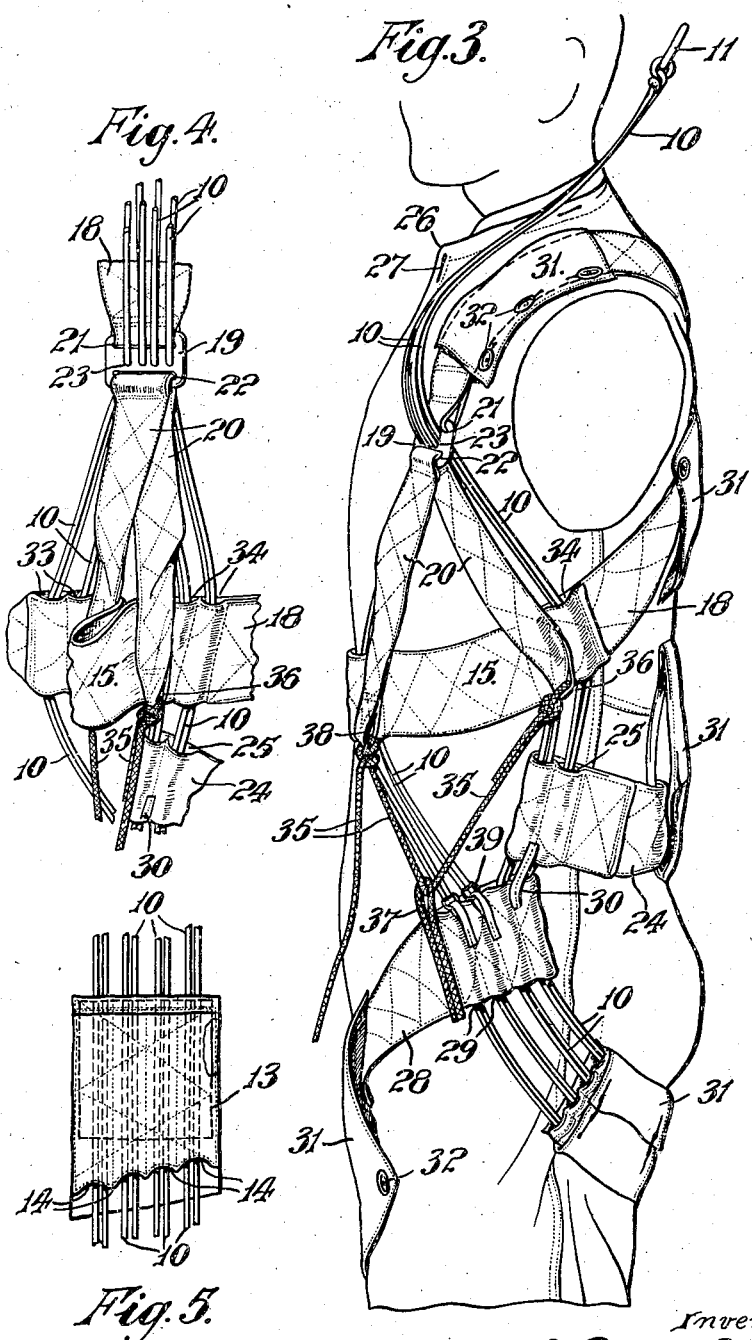

2,464,719

UNITED STATES PATENT OFFICE 2,464,719

PARACHUTE HARNESS

John Raymond Cuthbert Quilter,
Woking, England

Application February 21, 1946, Serial No. 649,237
In Great Britain March 9, 1945

6 Claims. (Cl. 244—151)

This invention relates to parachute harness for aviators.

The invention has for its main object to provide an improved harness of light weight, for comfortable wear, in tropical climates, the harness being of ventilated construction and adapted for wear in normally loose condition for example over the inner lining of a flying suit or like garment.

Another object of the invention is to provide a harness of this character which is tightened automatically upon the wearer when the load is taken by the suspension or lift webs, as in the event of a parachute descent.

A further object of the invention is to provide an improved parachute harness composed of a main sling affording a seat for the wearer during a parachute descent, the sling consisting of a number of cords arranged side by side and adapted to slip freely through guides upon a plurality of straps enclosing the upper part of the wearer's body, the sling cords being normally slack but retaining said straps loosely in their relative positions, and the tensioning of the sling cords under load automatically tightening the said straps upon the wearer.

Other objects and advantages of the invention will hereinafter appear from the following description of a preferred embodiment, given with reference to the accompanying drawings, in which:

Fig. 1 is a front view of the harness in the normal wearing position.

Fig. 2 is a rear view and

Fig. 3 is a side view of the same.

Fig. 4 is a partial side view showing the tightening of the waistcoat portion of the harness when the load tension acts upon the main sling through the suspension means.

Fig. 5 is a detail of the seat portion of the main sling.

As illustrated, the harness comprises a main sling which affords a seat for the wearer, the sling being composed of eight cords 10 having their extremities connected to D-shaped rings or shackles 11 to which the main lift webs 12 of the parachute are attached. The sling cords 10 are preferably similar to parachute rigging lines and made of silk or other suitable material; the seat portion of the sling includes square pads 13 of stiffening material let into several thicknesses of silk or other suitable material fabric rolled and stitched to provide guide tunnels 14 for the cords 10, as seen in Fig. 5.

Two chest straps 15 are normally connected by a central buckle 16 with a locking pin 17 or other suitable fastening; extensions 18 from the side ends of the chest straps 15 form cross braces passing from under the arms, diagonally across the back of the wearer and over his shoulders, a pair of buckles 19 being secured to the free ends of these cross braces 18 hanging forward over the shoulders. Two toggle straps 20, forming inverted V's, have their lower ends attached to the front and side ends of the respective chest straps 15, while their apices are attached to the buckles 19. These buckles consist of rectangular metal plates, slotted at 21 along their upper edges for attachment of the free ends of the cross braces 18 and at 22 along their lower edges for the attachment of the straps 20; the middles of the plates are perforated with holes 23 which are slidingly traversed by the eight sling cords 10 on each side. A back strap or belt 24 extends loosely across the small of the wearer's back, its ends being provided with tunnels 25 by which it is slidably supported by the sling cords.

The chest straps 15, their extensions or cross braces 18, the toggle straps 20 and the back strap or belt 24, together with the shoulder buckles 19, make up a loosely fitting waistcoat which is movable independently of the underlying garments, one of which is represented by the inner lining 26 of a flying suit or the like having detachable connections such as the button-holes 27; thus in tropical climates, the harness can be worn over the lining 26, the outer garments or flying suit being donned only when necessary.

Two leg loops 28 are each connected at one end to the seat portion of the main sling, for example beneath the stiffening pads 13, from which they extend up between the wearer's legs and over his thighs to points beneath the front ends of the back strap or belt 24, the upper extremities of these leg loops being provided with tunnels 29.

The back strap 24 is automatically positioned from the leg loops 28 by fabric distance pieces 30 at each end, this strap 24, the leg loops 28, the cross braces 18 and the seat sling itself being held loosely upon the garment lining 26 by means of fabric covers or flaps 31, which may be fastened by buttons 32 or lightly stitched in place to allow of removal for maintenance purposes. Pads such as 13 may be provided not only upon the seat portion of the sling, but at other parts of the harness, for example at the sides beneath the guide tunnels 25 and 29.

Tunnels are also provided upon the chest straps 15 at their front and side ends, that is, adjacent to the position of attachment of the toggle straps 20, these tunnels 33 and 34 being arranged in pairs at the respective attachment points, like the tunnels 25 of the back strap or belt 24, whereas the other tunnels 14 and 29 are grouped in fours, each tunnel receiving two of the sling cords 10. As seen in Figs. 1 and 3, below the shoulder buckles 19, the eight sling cords 10 on each side are divided into two groups of four, following approximately the lines of the toggle straps 20. One group of four passes freely through the two vertical tunnels 33 at the front end of the respective chest strap 15 and the other group of four passes freely through the two tunnels 34 at the side end of the strap 15, near its junction with the cross bracing or extension 18. The second group on each side continues downwards to pass freely through the two tunnels 25 at the respective end of the back strap 24, below which this group passes freely through the two rearmost of the four tunnels 29 at the end of the respective leg loop 28; the other two tunnels on the leg loop are traversed by the first group of cords coming from the tunnels 33 at the front end of the chest strap 15 on the same side, the two groups then combining to form the seat sling fitted with the stiffening pads 13, through the tunnels 14 of which they are freely slidable.

It will be seen, therefore, that the main suspension cords 10, when dormant in the loose condition of the harness, take up the shape of a diamond on each side; the position of the cords on one side of the harness is clearly seen in Fig. 3, the apex of the diamond being at the shoulder buckle 19, the lowest point being at the top edge of the leg loop 28, and the width of the diamond being represented by the length of the chest strap 15 between the two pairs of tunnels 33 and 34, that is, by the span of the toggle straps 20. When, however, the load is taken by the suspension and transmitted to the sling cords 10, this diamond shape naturally flattens or pulls out vertically as the cords 10 seek to assume straight lines under the tension; as shown in Fig. 4, the ends of the chest strap 15 move inwardly together, as well as the toggle straps 20 on each side, while the back strap 24 is pulled forward, thus automatically tightening the waistcoat portion of the harness upon the wearer.

In order to control the lifting of the chest straps 15 and cross bracing 18 under load, so that the harness may have a maximum degree of comfort and convenience, an adjustment cord 35 is provided on each side, secured at one end to a loop 36 at the junction of the chest strap 15 with its extension 18; the cord is passed down through a ring or loop 37 upon the upper edge of the leg loop 28 and then taken up to the front end of the chest strap 15, where it is tied to another loop 38, according to the required length, thus enabling the fitting to be adjusted to suit the height of the wearer. To secure the harness in the adjusted position, and to prevent the leg loops 28 from slipping down the sling cords 10 and thus becoming uncomfortably tight, the leg loops can be tied by weak threads 39 to the cords passing through their tunnels 29, these threads breaking as soon as the load is taken by the parachute.

In the preferred form of construction, this cord harness is an independent article of wear, not directly attached to a flying suit or the like except indirectly to the outside of an inner pocketless lining 26. Although the number of cords 10 composing the main sling has been given as eight, extending in pairs through the several tunnels, any desired number of cords may be employed; they may extend singly through a corresponding number of tunnels, or for example in threes through a smaller number of tunnels of larger size.

What I claim is:

1. A parachute harness comprising a main sling adapted to afford a seat for the wearer of said harness during a parachute descent, said sling consisting of a plurality of cords arranged side by side, a plurality of straps adapted to enclose the wearer's body, said straps forming an open vest movable independently of said sling, leg loops adapted to encircle the wearer's thighs, and guides provided upon said straps and leg loops, said sling cords passing slidably through said guides and including on each side of said harness a diamond shaped portion having its width represented by the distance between guides on one of said straps, the tensioning of said sling by the weight of the wearer during a parachute descent tightening said one strap on each side of said harness by pulling out said diamond shaped portion and thereby reducing its width.

2. A parachute harness comprising a main sling adapted to afford a seat for the wearer of said harness during a parachute descent, said sling consisting of a plurality of cords arranged side by side, a plurality of straps adapted to enclose the wearer's body, said straps including two chest straps having front and side ends, a central fastening for the front ends of said chest straps, a back strap, two extensions from the side ends of said chest straps, said extensions being adapted to pass diagonally across the wearer's back and over his shoulders, two straps forming inverted V's having their lower ends attached to the front and side ends of said chest straps, a pair of buckles secured to the free ends of said extensions and to the apices of said inverted V's, said buckles being apertured for sliding passage of said sling cords, and guides provided at the front and side ends of said chest straps and at the ends of said back strap for sliding passage of groups of said sling cords, said cords normally extending in diamond shape on each side of said harness with the apices of said diamonds adjacent to the respective buckles and their width represented by the distance apart of the guides at the front and side ends of said chest straps, and the tensioning of said sling by the weight of the wearer during a parachute descent tightening said chest strap on each side of said harness by pulling out said diamond shaped portion and thereby reducing its width.

3. A parachute harness comprising a main sling adapted to afford a seat for the wearer of said harness during a parachute descent, said sling consisting of a plurality of cords arranged side by side, a plurality of straps adapted to enclose the wearer's body, said straps including two chest straps having front and side ends, a central fastening for the front ends of said chest straps, a back strap, two extensions from the side ends of said chest straps, said extensions being adapted to pass diagonally across the wearer's back and over his shoulders, two straps forming inverted V's having their lower ends attached to the front and side ends of said chest straps, a pair of buckles secured to the free ends of said extensions and to the apices of said inverted V's, said buckles being apertured for sliding passage of said sling cords, leg loops adapted to encircle the wearer's thighs, guides provided at the front and side ends of said chest straps and at the ends of said back strap and leg loops for sliding passage of groups of said sling cords, said cords normally extending in diamond shape on each side of said harness with the apices of said diamonds adjacent to the respective buckles and their width represented by the distance apart of the guides at the front and side ends of said chest straps and their bottom angles adjacent to the guides at the upper ends of said leg loops, and the tensioning of said sling by the weight of the wearer during a parachute descent tightening said chest strap on each side of said harness by pulling out said diamond shaped portion and thereby reducing its width and simultaneously tightening said leg loops.

4. A parachute harness comprising a plurality of straps with fastening means, said straps in fastened condition being adapted to form a loose vest upon the body of a wearer, a main sling adapted to form a seat for the wearer of said harness during a parachute descent, said sling consisting of a plurality of cords arranged side by side, a pair of leg loops adapted to fit over the wearer's thighs, and guides upon said straps and leg loops, said sling cords passing slidably through said guides, two of said guides on each of two oppositely located straps of said harness being spaced apart lengthwise of the respective strap with a group of said sling cords passing through each of said spaced apart guides, the two groups of cords on each side of said harness passing down from said spaced apart guides to pass through closely spaced guides at the upper ends of the respective leg loops, and the tensioning of said sling by the weight of the wearer during a parachute descent tightening said straps having the spaced apart guides by drawing said last mentioned guides together on each side of said harness and simultaneously tightening said leg loops.

5. A parachute harness comprising a plurality of straps with fastening means, said straps in fastened condition being adapted to form a loose vest upon the body of a wearer, a main sling adapted to form a seat for the wearer of said harness during a parachute descent, said sling consisting of a plurality of cords arranged side by side, a pair of leg loops adapted to fit over the wearer's thighs, and guides upon said straps and leg loops, said sling cords passing slidably through said guides, two of said guides on each of two oppositely located straps of said harness being spaced apart lengthwise of the respective strap with a group of said sling cords passing through each of said spaced apart guides, the two groups of cords on each side of said harness passing down from said spaced apart guides to pass through closely spaced guides at the upper ends of the respective leg loops, an adjustment cord on each side of said harness, said adjustment cord being secured to one of said straps adjacent to a spaced apart guide and being tied to said one strap adjacent to the other spaced apart guide, and a ring upon the respective leg loop, said adjustment cord passing intermediately through said ring, and the tensioning of said sling by the weight of the wearer during a parachute descent tightening said straps having the spaced apart guides by drawing said last mentioned guides together on each side of said harness and simultaneously tightening said leg loops.

6. A parachute harness comprising a plurality of straps with fastening means, said straps in fastened condition being adapted to form a loose vest upon the body of a wearer, a main sling adapted to form a seat for the wearer of said harness during a parachute descent, said sling consisting of a plurality of cords arranged side by side, and guides upon said straps, said sling cords passing slidably through said guides, pads of stiffening material attached to said guides at points where the tensioning of said sling will apply pressure to the body of the wearer, two of said guides on each of two oppositely located straps of said harness being spaced apart lengthwise of the respective strap with a group of said sling cords passing through each of said spaced apart guides, and the tensioning of said sling by the weight of the wearer during a parachute descent tightening said respective straps by drawing said spaced apart guides together.

JOHN RAYMOND CUTHBERT QUILTER.

REFERENCES CITED

The following references are of record in the file of this patent:

FOREIGN PATENTS

| Number | Country | Date |
|---|---|---|
| 339,078 | Great Britain | Dec. 4, 1930 |
| 449,325 | Great Britain | June 22, 1936 |